(12) United States Patent
Farrow et al.

(10) Patent No.: US 10,458,293 B2
(45) Date of Patent: Oct. 29, 2019

(54) METERING PLATE FOR REDUCTION IN DISCHARGE COEFFICIENT VARIATION BETWEEN GASEOUS FUEL INJECTORS

(71) Applicants: Timothy J. Farrow, Fort Collins, CO (US); Jerrod C. Pedley, Loveland, CO (US); Roger M. Kifer, Fort Collins, CO (US); Steven A. DeHerrera, Fort Collins, CO (US)

(72) Inventors: Timothy J. Farrow, Fort Collins, CO (US); Jerrod C. Pedley, Loveland, CO (US); Roger M. Kifer, Fort Collins, CO (US); Steven A. DeHerrera, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 125 days.

(21) Appl. No.: 15/655,721

(22) Filed: Jul. 20, 2017

(65) Prior Publication Data

US 2019/0024541 A1   Jan. 24, 2019

(51) Int. Cl.
   *F01L 9/04*   (2006.01)
   *F01L 3/20*   (2006.01)
   (Continued)

(52) U.S. Cl.
   CPC ................ *F01L 9/04* (2013.01); *F01L 3/20* (2013.01); *F02M 21/0269* (2013.01);
   (Continued)

(58) Field of Classification Search
   CPC .... F16K 1/02; F16K 31/00; F01L 3/20; F01L 9/04; F01L 2009/0403; F02M 21/0269; F02M 21/0272
   (Continued)

(56) References Cited

U.S. PATENT DOCUMENTS 4,210,311 A   7/1980 Stone
4,552,177 A   11/1985 Lapeyre
(Continued)

FOREIGN PATENT DOCUMENTS

DE   10 2014 205496 A1   10/2015
DE   10 2014 212320 A1   12/2015
(Continued)

OTHER PUBLICATIONS

MEGASOL Gas Injection Valves for Gas & Dual Fuel Engines, Metering of gas by solenoid, Engine & Turbine Controls, Heinzmann, product pamphlet, 2002, 4 pages, Heinzmann GmbH & Co.KG, Germany.
(Continued)

*Primary Examiner* — Ching Chang
(74) *Attorney, Agent, or Firm* — Reinhart Boerner Van Deuren P.C.

(57) ABSTRACT

Provided is a metering plate for a poppet-style valve in which the metering plate includes a peripheral edge structure that reduces the impact of edge variation as a result of typical manufacturing tolerances. The peripheral edge structure is located at the sealing surface and extends from the peripheral surface of the metering plate so as to avoid a sharp edge at the outer diameter of the metering plate. In embodiments, the peripheral edge structure is a chamfered surface or a curved surface. Small dimensional deviations from these surfaces resulting from typical manufacturing tolerances do not have a significant effect on the discharge coefficient of the metering plate. In this way, the discharge coefficients of poppet-style valves across a fluid admission system are contained in a much tighter range, thereby enhancing the efficiency of and control over the fluid admission system.

26 Claims, 6 Drawing Sheets

(51) Int. Cl.
*F02M 21/02* (2006.01)
*F02M 51/06* (2006.01)

(52) U.S. Cl.
CPC .... *F02M 21/0272* (2013.01); *F02M 51/0639* (2013.01); *F01L 2009/0403* (2013.01)

(58) Field of Classification Search
USPC ......... 123/90.11; 137/601.02, 625.28, 625.3, 137/625.38; 251/129.07, 129.17
See application file for complete search history.

(56) References Cited

U.S. PATENT DOCUMENTS

| | | | |
|---|---|---|---|
| 5,108,074 A * | 4/1992 | Chavaillaz | F16K 3/34 251/205 |
| 5,398,724 A | 3/1995 | Vars et al. | |
| 5,939,811 A | 8/1999 | Enomoto et al. | |
| 5,967,487 A | 10/1999 | Cook et al. | |
| 6,000,677 A | 12/1999 | Cook et al. | |
| 6,112,765 A | 9/2000 | Boyer | |
| 6,321,767 B1 | 11/2001 | Seid et al. | |
| 6,832,619 B1 | 12/2004 | Walsh | |
| 7,000,895 B2 | 2/2006 | Gessaman | |
| 7,152,628 B2 | 12/2006 | Folk et al. | |
| 8,272,399 B2 | 9/2012 | Farrow et al. | |
| 2002/0079472 A1 | 6/2002 | Kumar | |
| 2009/0309053 A1 | 12/2009 | Farrow et al. | |
| 2014/0166143 A1 | 6/2014 | Buelow et al. | |

FOREIGN PATENT DOCUMENTS

| | | |
|---|---|---|
| DE | 10 2015 206207 A1 | 10/2016 |
| EP | 0 717 186 A2 | 6/1996 |

OTHER PUBLICATIONS

Woodward Installation and Operation Manual, SOGAV™ Solenoid Operated Gas Admission Valve, SOGAV 36, Manual 26209 (Revision H), 2009, 36 pages, Woodward, Fort Collins, Colorado (Previous revision G published in 2006).

* cited by examiner

METERING PLATE FOR REDUCTION IN DISCHARGE COEFFICIENT VARIATION BETWEEN GASEOUS FUEL INJECTORS

FIELD OF THE INVENTION

This invention generally relates to valves, and more particularly, to a poppet-style valve for a gas fuel system.

BACKGROUND OF THE INVENTION

Poppet-style valves are typically used in gaseous and/or liquid fuel injectors and generally consist of flat metering plates that seal against one another when the valve is closed. In high pressure industrial applications, for example, high pressure fuel flows through the poppet-style valve, which creates flow forces around the metering plates as they open and close. A large internal combustion engine, especially in an industrial application, typically includes several poppet-style valves to regulate fuel flow into the engine's combustion chamber. In order to provide predictable and reliable engine output, all of the injectors in such a large internal combustion engine must have similar fuel discharge characteristics. Otherwise, large variations in fuel discharge may be experienced between the multiple injectors of the engine.

The nature of the seal between the metering plates generally requires the metering plates to have a flat surface. This flatness requirement drives the creation of a sharp, 90° edge at the outer perimeter of the metering plate. That is, the peripheral edge of the metering plate proximal to the sealing surface forms a 90° angle. Using conventional manufacturing techniques, achieving a perfectly sharp edge is difficult, and small deviations from sharp are produced under normal manufacturing tolerances. In a large engine, especially in light of the high fuel pressure, even relatively small deviations from sharp on a plate-to-plate basis affect the discharge characteristics between the various injectors. Indeed, the discharge coefficient of a metering plate is much more sensitive as the edge approaches sharpness. Put differently, the percentage change in discharge coefficient increases as a result of deviations associated with typical manufacturing tolerances the closer the edge gets to 90°.

Because of the difficulty in manufacturing metering plates having consistent dimensions and because such inconsistencies have a drastic effect on the discharge coefficient of conventional sharp-edge metering plates, a need exists in the art for a metering plate that overcomes these difficulties. Embodiments of the presently disclosed invention provide such a metering plate. These and other advantages of the invention, as well as additional inventive features, will be apparent from the description of the invention provided herein.

BRIEF SUMMARY OF THE INVENTION

Embodiments of the presently disclosed invention provide a metering plate for a poppet-style valve in which the metering plate is provided with a peripheral edge structure that reduces the impact of edge variation as a result of typical manufacturing tolerances. In particular, the peripheral edge structure is located at the sealing surface and extends from the peripheral surface of the metering plate so as to avoid a sharp edge at the outer diameter of the metering plate. In some embodiments, the peripheral edge structure is a chamfered surface, a curved surface, etc. Advantageously, small dimensional deviations from these surfaces resulting from typical manufacturing tolerances do not have a significant effect on the discharge coefficient of the metering plate.

In one aspect, embodiments of a metering plate for a poppet-style valve are provided. The metering plate includes a fluid-directing body that defines a first surface and at least one peripheral surface substantially perpendicular to the first surface. Additionally, the metering plate includes at least one peripheral edge structure located proximal to the first surface and extending between the first surface and the at least one peripheral surface. In particular, the peripheral edge structure includes a transition surface that extends at least a portion of the at least one peripheral edge structure between the first surface and the at least one peripheral surface.

In a particular embodiment, the at least one peripheral edge structure further includes an edge face that defines a furthest peripheral extent of the metering plate, and the transition surface extends between the first surface and the edge face.

In embodiments of a circular metering plate, the fluid-directing body is a generally cylindrical disc such that the first surface has a first diameter. Further, the at least one peripheral edge structure defines a second diameter at the furthest peripheral extent. The second diameter is from 0.1% to 5% larger than the first diameter. In another embodiment, the at least one peripheral surface spans a first vertical distance, and the at least one peripheral edge structure spans a second vertical distance. In particular, the second vertical distance is at least 10% of the first vertical distance.

In one embodiment of the metering plate, the transition surface is a chamfer. The chamfer extends a peripheral distance and a vertical distance between the first surface and the edge face. The ratio of the peripheral distance to the vertical distance is from 1:10 to 10:1. In certain embodiments, the edge face and the first surface are perpendicular. In other embodiments, the edge face and the first surface form an angle of from 60° to 120°.

In a second embodiment of the metering plate, the transition surface is a curved surface. In such an embodiment, the first surface and the edge face are disposed from each other by a peripheral distance, and the curved surface has a radius of curvature greater than or equal to the peripheral distance. More particularly, the radius of curvature is less than ten times the peripheral distance. In embodiments, the edge face and the first surface are perpendicular. Further, in embodiments, the curved surface defines an arc having a central angle of between 8° and 90°.

In still another embodiment of the metering plate, the first surface defines a first plurality of lands. Each land of the first plurality of lands is separated from its neighboring land by a groove formed through the first surface. Further, in embodiments, each land includes a peripheral edge structure of the at least one peripheral edge structure between a peripheral surface of the at least one peripheral surface and the first surface. In such embodiments, the transition surface of each peripheral edge structure of the at least one peripheral edge structure extends the entire distance between the peripheral surface of the at least one peripheral surface and the first surface. Additionally, in embodiment, the at least one peripheral edge structure includes a transition surface that is a chamfer, and in still other embodiments, the at least one peripheral edge structure includes a transition surface that is a curved surface.

In another aspect, embodiments of a poppet-style valve are provided. The poppet-style valve includes a movable metering plate, a fixed metering plate, and a solenoid. The movable metering plate is characterized by a first plurality of lands and a first plurality of grooves formed into a first surface. At least one peripheral surface is substantially perpendicular to the first surface. In particular, a peripheral edge structure is located proximal to the first surface and extends between the first surface and the at least one peripheral surface. Further, each of the at least one peripheral edge structure includes a transition surface that extends at least a portion of the at least one peripheral edge structure between the first surface and the at least one peripheral surface. The fixed metering plate is characterized by a second plurality of lands and a second plurality of grooves. The solenoid is configured to electromagnetically move the movable metering plate between an open position and a closed position. In the closed position, the first plurality of lands and the second plurality of lands are in direct, physical contact such that the first plurality of lands blocks fluid flow through the second plurality of grooves and the second plurality of lands blocks fluid flow through the first plurality of grooves.

In an embodiment of the poppet-style valve, the transition surface is a chamfer. Particularly, the chamfer extends a peripheral distance and a vertical distance between the first surface and the edge face, and the ratio of the peripheral distance to the vertical distance is from 1:10 to 10:1. In another embodiment, the transition surface is a curved surface that defines an arc having a central angle of between 8° and 90°. In certain embodiments, the movable metering plate is a generally cylindrical disc such that the first surface has a first diameter. Further, the peripheral edge structure defines a second diameter at a furthest peripheral extent, and the second diameter is from 0.1% to 5% larger than the first diameter. In still other embodiments, the peripheral surface spans a first vertical distance, and the peripheral edge structure spans a second vertical distance. The second vertical distance is at least 10% of the first vertical distance. In yet another embodiment of the poppet-style valve, a gap of 1 mm or less exists between the movable metering plate and the fixed metering plate in the open position. In still yet another embodiment, one or more of the first plurality of lands includes a peripheral edge structure of the at least one edge structure.

In still another aspect, embodiments of a fluid admission system are provided. The fluid admission system includes a gaseous intake manifold, a fluid supply manifold, and at least two poppet-style valves. Each poppet-style valve is configured to allow fluid flow from the fluid supply manifold into the gaseous intake manifold in an open configuration and to prevent fluid flow from the fluid supply manifold into the gaseous intake manifold in a closed configuration. Further, each poppet-style valve includes a movable metering plate, a fixed metering plate, and solenoid. The movable metering plate is characterized by a first surface and at least one peripheral surface that is substantially perpendicular to the first surface. A peripheral edge structure is located proximal to the first surface and extends between the first surface and the at least one peripheral surface. Further, each of the at least one peripheral edge structure includes a transition surface that extends at least a portion of the at least one peripheral edge structure between the first surface and the at least one peripheral surface. The solenoid is configured to electromagnetically actuate the poppet-style valve between the open configuration in which the fixed metering plate and the movable metering plate are separated by a gap and the closed configuration in which the fixed metering plate and the movable metering plate are in direct, physical contact.

In embodiments of the fluid admission system, each poppet-style valve has a discharge coefficient, and all of the discharge coefficients of each poppet-style valve are within 5% of each other.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
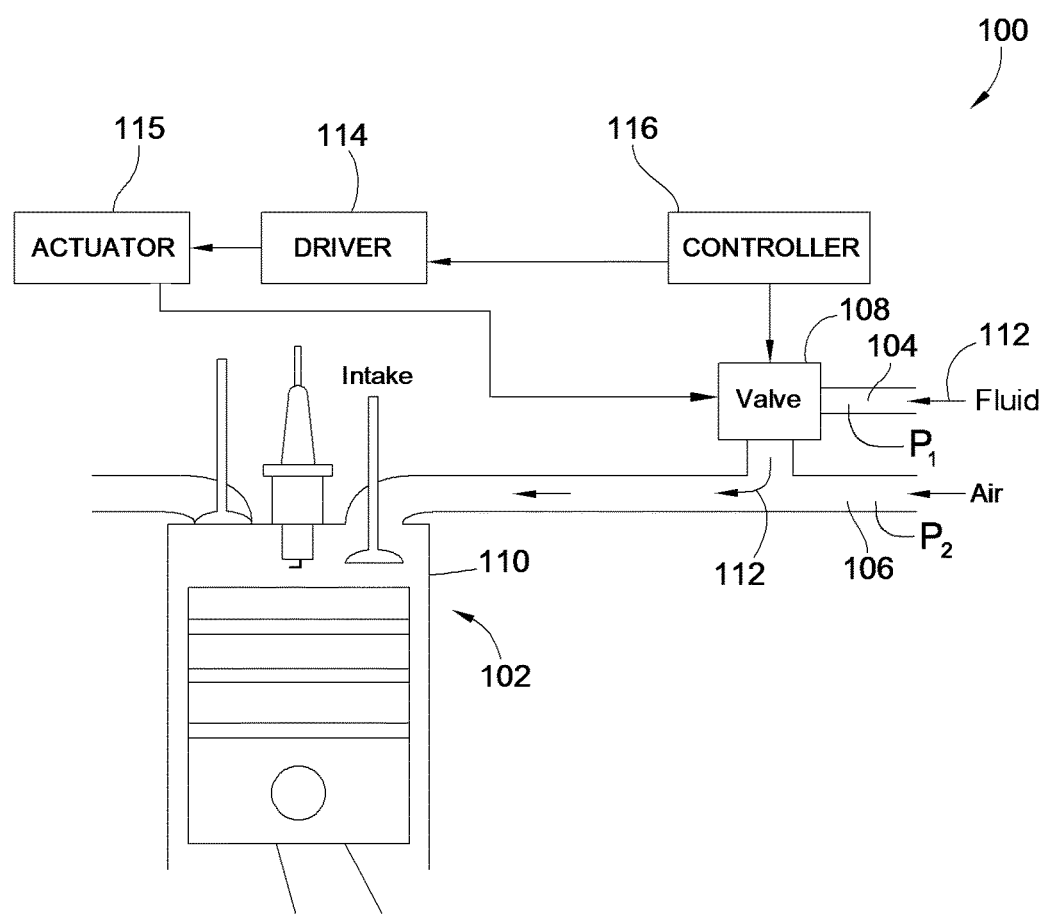
FIG. 1 is a schematic representation of a fluid admission system, according to an exemplary embodiment.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a metering plate usable in a poppet-style valve for a fluid admission system are provided herein. The metering plate is designed such that variation in the discharge coefficients caused by the flow of fluid around and through such metering plates across multiple poppet-style valves in a fluid admission system is reduced. The variation in discharge coefficients is reduced by machining or forming a peripheral edge structure around the metering plates and/or into the peripheral surfaces of the lands between the grooves of the metering plate. Regarding the former configuration, the peripheral edge structure projects annularly around the metering valve at or near the sealing surface of the metering plate, which is where fluid is admitted through the poppet-style valve. Regarding the latter configuration, one or more of the concentric rings on the sealing surface of the metering plate feature a peripheral edge structure formed into the lands defining the concentric rings. In either embodiment, the peripheral edge structure disclosed herein is not a sharp edge but instead is a chamfered or curved edge, for example. Deviations from the peripheral edge structure produced under normal manufacturing tolerances have a much lesser effect on discharge coefficient than deviations from the conventional sharp edge. In this way, the variation in discharge coefficients across multiple poppet-style valves in a fluid admission system is greatly reduced. The embodiments of the metering plate discussed herein as well as the particular fluid admission system and type of poppet-style valve are presented by way of illustration only and not by way of limitation. A person having ordinary skill in the art, upon consideration of the present disclosure, may recognize other contexts and applications for which the metering plate may also be suitable.

In order to provide context for the improvement to the metering plate of the poppet-style valve discussed herein, the system in which the poppet-style valve operates and the operation of the poppet-style valve itself will initially be discussed. Thus, referring to FIG. 1, an embodiment of a fluid admission system 100 for use with an internal combustion engine 102 is shown. The engine 102 may be a multiple cylinder, large bore engine capable of generating extremely high power for use in industrial applications. Although the fluid admission system 100 is shown associated with an internal combustion engine 102 in FIG. 1, it is to be understood that the fluid admission system 100 is not specific to a particular type of engine configuration or application. For example, the fluid admission system 100 may be used with a reciprocating air and gas compressor, a continuous combustion engine (e.g., a turbine engine), a compression ignition engine, and the like.

As illustrated, the fluid admission system 100 includes a fluid supply manifold 104, an air intake manifold 106, a poppet-style valve 108 located between the fluid supply manifold 104 and the air intake manifold 106, and a combustion cylinder 110. When the poppet-style valve 108 is in the open position, fluid at a first pressure $P_1$ flows from the fluid supply manifold 104 through the poppet-style valve 108 to the air intake manifold 106 where the fluid mixes with a flowing stream of air before it is admitted to the combustion cylinder 110.

The air intake manifold 106 is maintained at a second pressure $P_2$ (generally atmospheric pressure) that is typically less than the first pressure $P_1$. As a result, pressurized fluid will flow from the area of the higher first pressure $P_1$ in the fluid supply manifold 104 through the poppet-style valve 108 to the area of the lower second pressure $P_2$ in the air intake manifold 106 when the poppet-style valve 108 is in an open position. In FIG. 1, the direction of fluid flow is shown generally by arrows 112.

The poppet-style valve 108 is configured to move linearly between a fully closed position and a fully open position. Movement of the valve is generally electromagnetically actuated. Fluid flow from the fluid supply manifold 104 to the air intake manifold 106 is blocked when the poppet-style valve 108 is in the closed position. Fluid is allowed to flow from the fluid supply manifold 104 to the air intake manifold 106 when the poppet-style valve 108 is in the open position.

The fluid admission system 100 also includes a driver 114, an actuator 115, and an engine controller 116. The driver 114 includes electronic circuitry to electronically activate the actuator 115 to open the poppet-style valve 108, and to de-activate the actuator 115 to close the poppet-style valve 108. Although the poppet-style valve 108 is described as being electronically controlled by an electronic driver 114, it is to be understood that the poppet-style valve 108 may be mechanically, hydraulically, or pneumatically controlled if desired.

The engine controller 116 such as, for example, an electronic fuel injection controller (EFIC) controls engine speed by monitoring various operating parameters of the engine 102, and controlling the driver 114 to move the poppet-style valve 108 from the closed position to the open position, and vice versa. In one embodiment, the engine 102 is a multi-cylinder engine having a poppet-style valve 108 associated with each of the individual cylinders 110. The poppet-style valve 108 is operably controlled by the engine controller 116 and driver 114 to regulate fluid flow to each of the individual cylinders 110. Specifically, the engine controller 116 receives measurements of an engine operating parameter such as, for example, the speed and/or angular position of a shaft associated with the engine 102. The engine controller 116 then sends control signals to the driver 114 dictating the sequence in which the various valves 108 will open and close based on the sensed engine parameters. In embodiments, the engine controller 116 is also configured to control the duration of time that an individual poppet-style valve 108 is in the open position, i.e., "dwell time." As a result, the engine controller 116 is capable of controlling the operation of the poppet-style valve 108 in a consistent, repeatable manner to ensure consistent admission of fluid to the engine combustion cylinder 110 and, thus, balanced firing throughout each cycle of engine operation.

Figure 2:
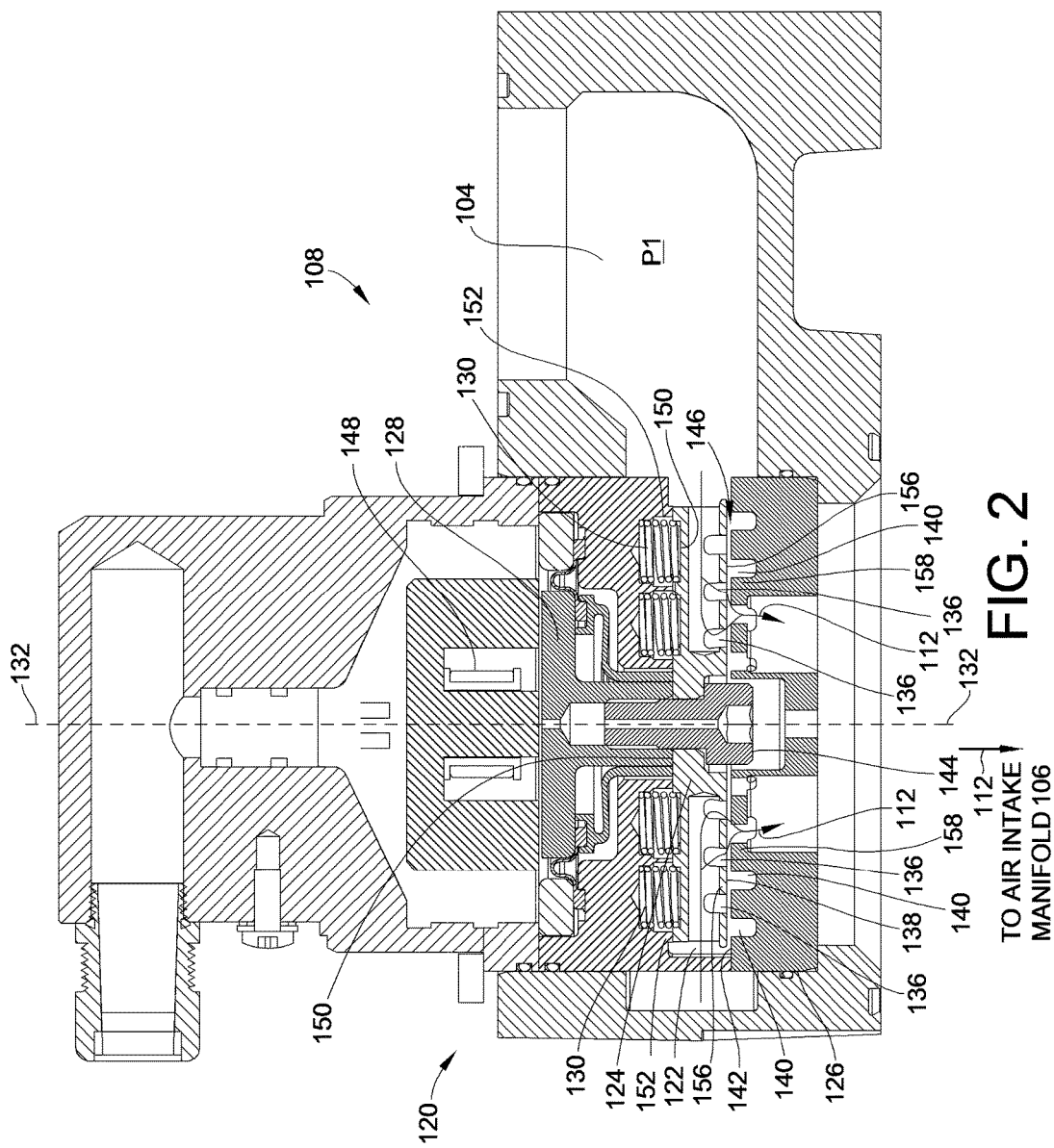
FIG. 2 depicts a poppet-style valve in an open configuration and including the metering plate configured for reduced discharge coefficient variation, according to an exemplary embodiment.

Referring to FIG. 2, the poppet-style valve 108 is shown in an open position. The poppet-style valve 108 generally includes a valve housing 120 defining an inlet chamber 122 therein, a movable metering plate 124, a fixed metering plate 126, an armature 128, and a biasing element illustrated in the form of a plurality of spring elements 130.

The inlet chamber 122 is in fluid communication with the fluid supply manifold 104, which is maintained at the fluid pressure $P_1$ of the high pressure fluid supply. As a result, the inlet chamber 122 is likewise maintained at the fluid supply pressure $P_1$ of the fluid supply manifold 104. The movable metering plate 124, the armature 128, and the spring element 130 are all coupled together such that the spring element 130 contracts and expands as the movable metering plate 124 and the armature 128 move linearly in the inlet chamber 122 along a linear travel axis 132.

A first plurality of grooves 136 is located in the bottom surface, or sealing surface 138, of the movable metering plate 124. A second plurality of grooves 140 is located in the upper surface, or abutment surface 142, of the fixed metering plate 126. In the illustrated embodiment, each of the first plurality of grooves 136 and the second plurality of grooves 140 is provided by a plurality of concentric, circular channels formed on the sealing surface 138 of the movable metering plate 124 and the abutment surface 142 of the fixed metering plate 126, respectively.

As shown in FIG. 2, the movable metering plate 124 and the fixed metering plate 126 are separated forming a gap 146 when the poppet-style valve 108 is in the open position, thereby providing an open flow passage through the valve housing 120 such that fluid from the fluid supply manifold 104 flows through the first and second pluralities of grooves 136, 140 (fluid flow indicated generally by arrows 112) to the air intake manifold 106.

The armature 128 is located within the valve house 120 and at least partially in inlet chamber 122. The armature 128 is operably coupled to the movable metering plate 124 by a fastener 144 such as, for example, a bolt, a screw, or the like. In embodiments, energization of a solenoid 148 causes the armature 128 to move linearly along the axis 132 within valve housing 120, thereby causing the movable metering plate 124 coupled thereto to move in a similar linear manner. That is, when the solenoid 148 is energized, a magnetic field is generated that attracts the armature 128 to move the poppet-style valve 108 from the closed position toward the open position. Accordingly, the magnetic field generated must be sufficient to overcome the spring force from the springs 130 and the fluid pressure $P_1$ that tend to keep the poppet-style valve 108 in the closed position. Upon de-energization of the solenoid 148, the springs 130 and fluid pressure $P_1$ cause the poppet-style valve 108 to move from the open position toward the normally closed position.

As a result of the linear translation of the movable metering plate 124 along the axis 132, the spring elements 130 acting on the upper surface 150 of the movable metering plate 124 contract until an upper surface 150 of the movable metering plate 124 contacts a stop plate 152 formed in the valve housing 120. The stop plate 152 functions to limit axial movement of the movable metering plate 124 in a particular direction, e.g., a vertical direction. In one embodiment, the gap 146 between the sealing surface 138 of the movable metering plate 124 and the abutment surface 142 of the fixed metering plate 126 is, for example, approximately 0.5 mm when the poppet-style valve is in the fully open position. Therefore, the poppet-style valve 108 may be opened and closed in a rapid, fast-acting manner (e.g., 1.2 milliseconds) due to the short transition distance between the fully closed position and the fully open position.

As shown in FIG. 2, the sealing surface 138 of the movable metering plate 124 includes a first plurality of lands 156 separating adjacent ones of the first plurality of grooves 136. Preferably, lands 156 are wider than the adjacent grooves 136. Similarly, the abutment surface 142 of the fixed metering plate 126 includes a second plurality of lands 158 which separate adjacent ones of the second plurality of grooves 140. Preferably, lands 158 are wider than the adjacent grooves 140.

Figure 3:
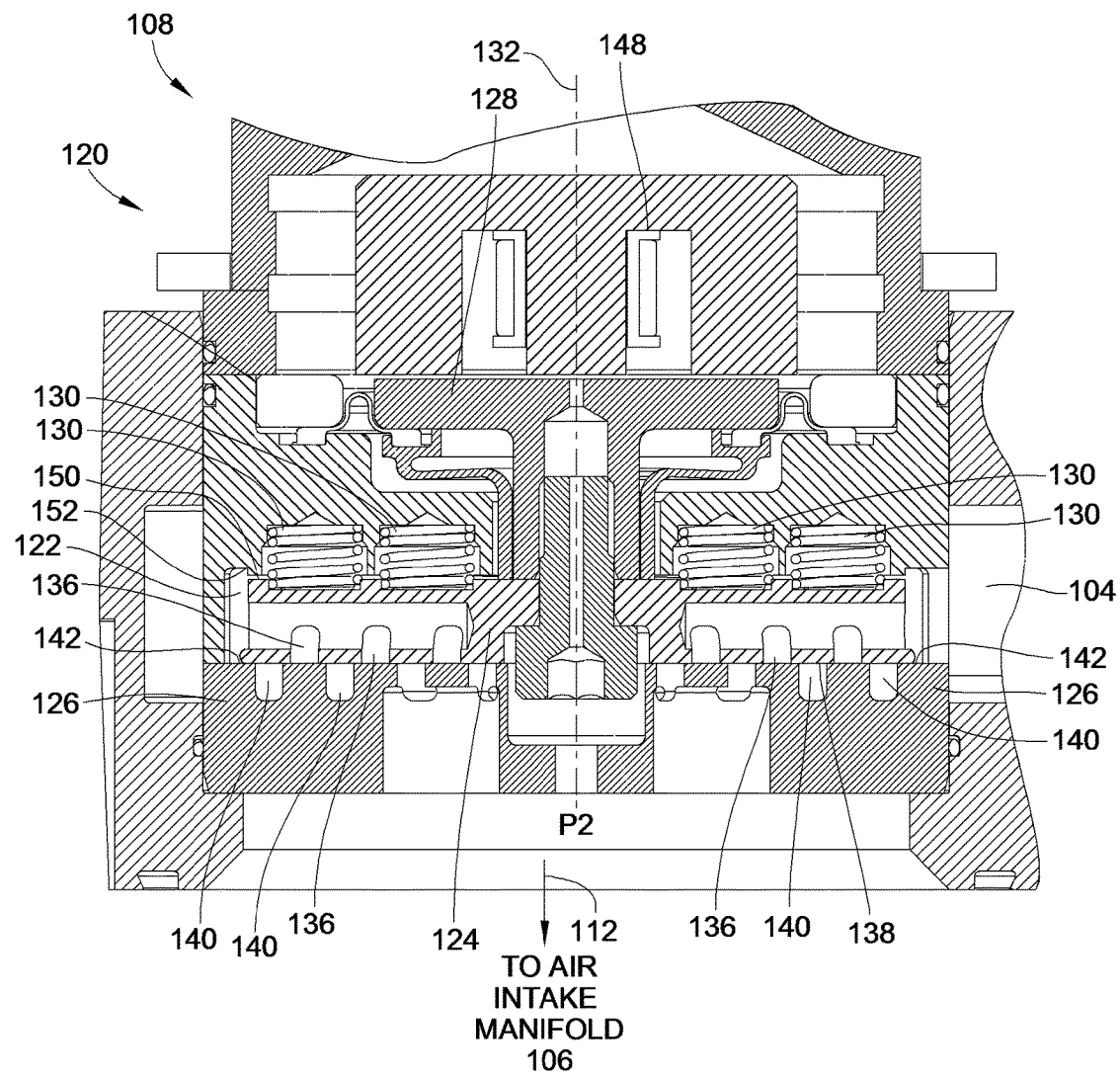
FIG. 3 depicts the poppet-style valve of FIG. 2 in a closed configuration, according to an exemplary embodiment.

In the closed position as depicted in FIG. 3, the sealing surface 138 of the movable metering plate 124 abuts the abutment surface 142 of the fixed metering plate 126. In the closed position, various ones of the first plurality of lands 156 of the movable metering plate 124 align with and overlap a corresponding one of the second plurality of grooves 140 of the fixed metering plate 126. Similarly, various ones of the second plurality of lands 158 of the fixed metering plate 126 overlap and align with a corresponding one of the first plurality of grooves 136 of the movable metering plate 124 when the poppet-style valve 108 is in the closed position. As such, the lands 156 of the movable metering plate 124 are wider than the corresponding grooves 140 of the fixed metering plate 126. Similarly, lands 158 of the fixed metering plate 126 are wider than the corresponding grooves 136 of the movable metering plate 124. In this way, when the bottom surface 138 of the movable metering plate 124 is in abutment with the upper surface 142 of the fixed movable plate 126 in the closed position, the first plurality of lands 156 in the movable metering plate 124 block fluid flow through the second plurality of grooves 140 of the fixed metering plate 126. Similarly, the second plurality of lands 158 in the fixed metering plate 126 block fluid flow through the first plurality of grooves 136 in the movable metering plate 124. In this way, no fluid flows through the poppet-style valve 108.

Figure 4:
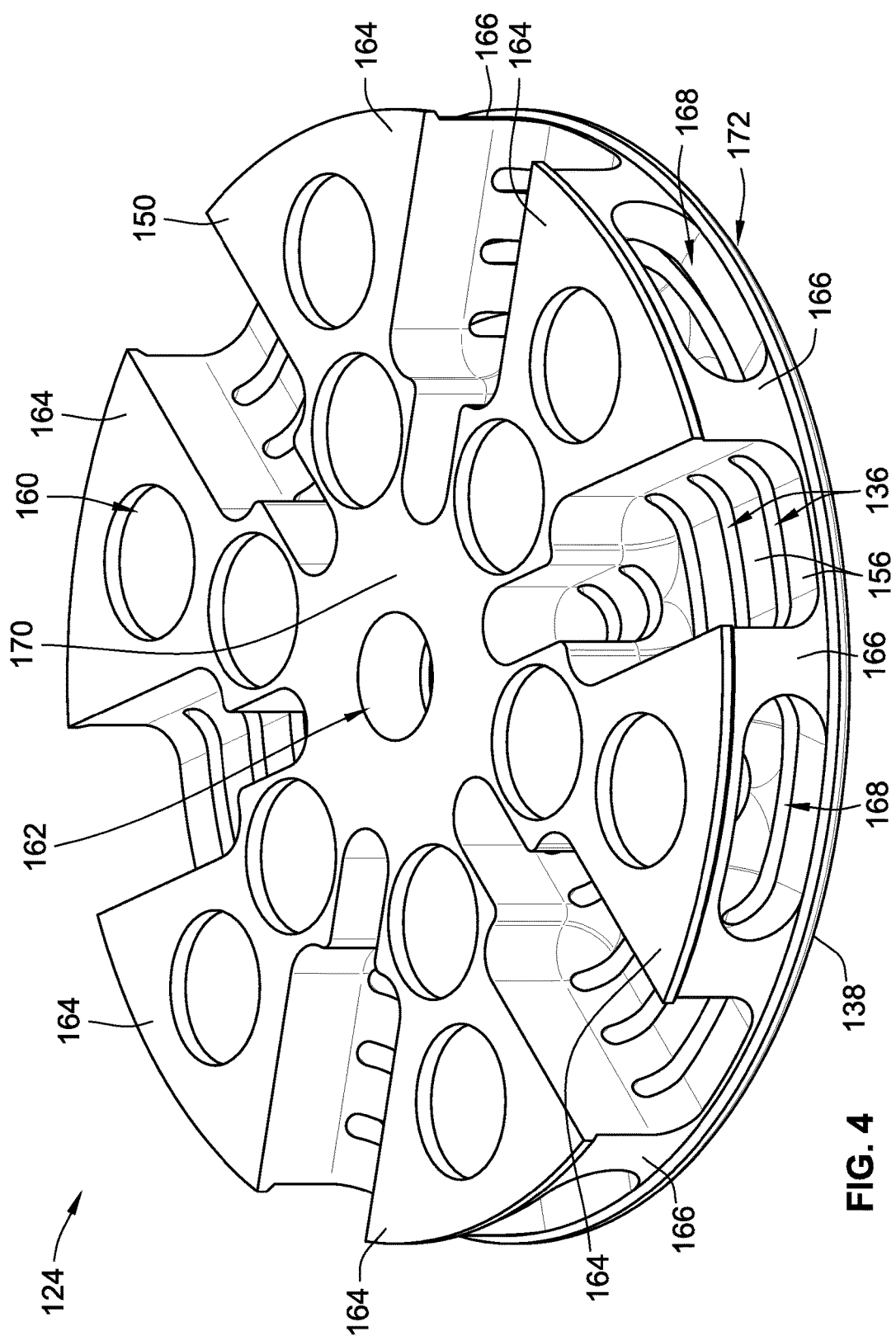
FIG. 4 depicts a metering plate configured for reduced discharge coefficient variation, according to an exemplary embodiment.

Having generally provided context for use and operation of the poppet-style valve 108, the improvement to the movable metering plate 124 will now be discussed. Referring now to FIG. 4, an embodiment of the movable metering plate 124 is depicted. The movable metering plate 124 generally has the form of a cylindrical disc; although, the movable metering plate 124 takes the form of different shapes in other embodiments, such as polygons (e.g., rectangles, squares, triangles, hexagons, octagons, etc.) and curved or lobed shapes (e.g., ovals, clovers, ellipses, racetrack, etc.). As discussed above, the first plurality of grooves 136 and the first plurality of lands 156 are defined in the sealing surface 138 of the movable metering plate 124. Additionally, several spring cavities 160 are depicted as being formed in the upper surface 150, which facilitate placement and retention of the springs 130 (as shown in FIG. 2). The movable metering plate 124 also defines an aperture 162 extending through the thickness of the movable metering plate 124 from the upper surface 150 to the sealing surface 138. The aperture 162 is adapted to receive the fastener 144 used to secure the armature 128 (both shown in FIG. 2).

As illustrated in FIG. 4, the upper surface 150 is defined by six radially extending lobes 164; however, other embodiments include more or fewer than six lobes 164. The radially outermost extent of each lobe 164 defines a peripheral surface 166. A channel 168 is formed through each peripheral surface 166 of each lobe 164 and extends radially inward at least as far as the innermost groove 136. The channels 168 provide fluid communication between the inlet chamber 122 (shown in FIG. 2) and the grooves 136 on the interior of the movable metering plate 124. Thus, the structure of the movable metering plate 124 is designed to maintain a unitary construction while also providing a porting arrangement for supplying fluid to the interior of the movable metering plate 124. Because the movable metering plate 124 is designed to transport fluid via the porting arrangement, the structure of the movable metering plate 124 is referred to as a fluid-directing body 170. That is, the solid portion of the cylindrical disc into which the grooves 136 and channel 168 are formed is referred to herein as the fluid-directing body 170.

As mentioned above, the movable metering plate 124 is moved over a short distance (e.g., 0.5 mm) quickly (e.g., in 1.2 milliseconds). Thus, in order to move a sufficient amount of fluid through the valve, the fluid has to infiltrate the movable metering plate 124 as well as rush in from outside of the movable metering plate 124 when the valve is open. Accordingly, the flow characteristics of the fluid moving through and around the movable metering plate 124 will affect the discharge characteristics of the valve. In this regard, the manufacturing tolerances of the movable metering plate 124 are an important consideration in optimizing the discharge characteristics of a fuel system that may contain several such poppet-style valves, each having its own movable metering plate 124.

Accordingly, the movable metering plate 124 of the present disclosure features a peripheral edge structure 172. In embodiments, the peripheral edge structure 172 extends radially from a peripheral surface 166 of the movable metering plate 124. The peripheral edge structure 172 is depicted as proximal to the sealing surface 138. In an embodiment, the peripheral edge structure 172 spans from 10% to 20% of the distance between the sealing surface 138 and the upper surface 150 (or 10% to 20% of the span of the peripheral surface 166 of the lobes 164). More particularly, in embodiments, the peripheral edge structure 172 spans at most the distance between sealing surface 138 and the bottom of the opening of the channel 168. In another embodiment, the peripheral edge structure 172 spans up to the entire distance between the sealing surface 138 and the upper surface 150 (or the entire span of the peripheral edge surface 166 of the lobes 164). In this latter embodiment, the channel 168 will extend through the peripheral edge structure 172, instead of the peripheral surface 166, in order to provide fluid communication in the fluid directing body 170. Further, in the depicted cylindrical disc embodiment, the sealing surface 138 defines a first diameter, and the further peripheral extent of the peripheral edge structure 172 defines a second diameter that is larger than the first diameter. In a particular embodiment, the second diameter is from 0.1% to 5% larger than the first diameter. However, in other non-cylindrical embodiments, the largest span of the peripheral edge structure is from 0.1% to 5% larger than the largest span of the sealing surface 138.

Figure 5:
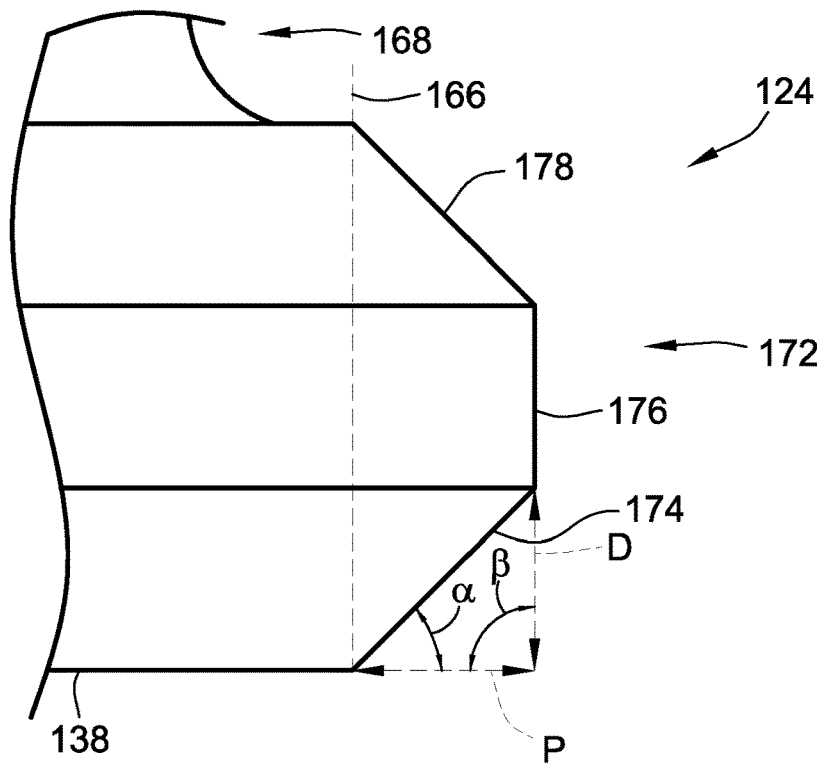
FIG. 5 depicts a chamfered peripheral edge structure for the metering plate configured to reduce discharge coefficient variation, according to an exemplary embodiment.

As shown in FIG. 5, the peripheral edge structure 172 includes a chamfered surface 174. As can be seen in FIG. 5, the chamfered surface 174 transitions from the sealing surface 138 to an edge face 176 that is vertically disposed from the sealing surface 138. Generally, the sealing surface 138 extends peripherally as far as the peripheral surface 166 (represented a dashed line in FIG. 5 because of the opening of the channel 168 through the peripheral surface 166), and the edge face 176 defines the farthest peripheral extent of any feature on the movable metering plate 124. Because of the difference in peripheral extents and vertical positions of the sealing surface 138 and the edge face 176, the chamfered surface 174 extends a peripheral distance P and a vertical distance D between the sealing surface 138 and the edge face 176. The ratio between the peripheral distance P and the vertical distance D defines the angle of the chamfered surface 174. In embodiments, the ratio of P to D is from 1:10 to 10:1. In other embodiments, the ratio of P to D is from 1:5 to 5:1, and in still other embodiments, the ratio of P to D is from 1:2 to 2:1. In the embodiment depicted, the sealing surface 138 and the edge face 176 are perpendicular to each other such that, at a ratio of P to D of 1:1, the angle a of the chamfered surface 174 is 45°. However, the sealing surface 138 and the edge face 176 need not be perpendicular to each other, and instead, in other embodiments, the angle β between the sealing surface 138 and the edge face 176 is from 60° to 120°.

Additionally, as shown in FIG. 5, the peripheral edge structure 172 features a second chamfered surface 178. The second chamfered surface 178 transitions from the edge face 176 back to the peripheral surface 166. In embodiments, the second chamfered surface 178 transitions back to the peripheral surface 166 at the same angle as the chamfered surface 174. However, in other embodiments, the second chamfered surface 178 extends back to the peripheral surface 166 at a shallower or steeper angle. Further, in other embodiments, the peripheral edge structure 172 does not feature a second chamfered surface 178, and instead, the edge face 176 extends from the chamfered surface 174 to the upper surface 150 (as shown in FIG. 3).

Figure 6:
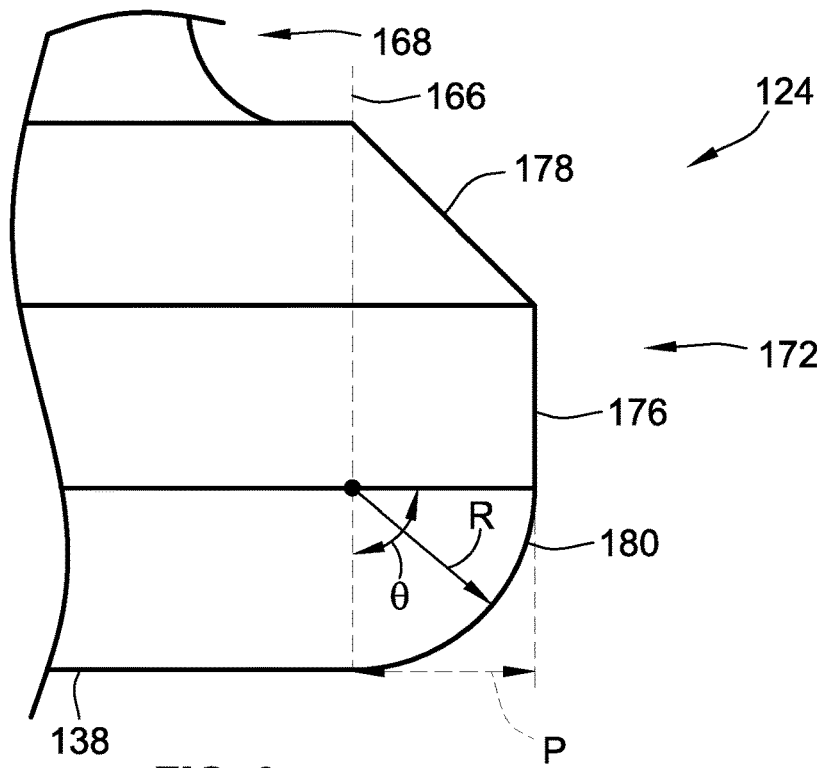
FIG. 6 depicts a curved peripheral edge structure for the metering plate configured to reduce discharge coefficient variation, according to an exemplary embodiment.

In another embodiment shown in FIG. 6, the peripheral edge structure 172 includes a curved surface 180 that transitions between the sealing surface 138 and the edge face 176. Similar to the previous embodiment, the edge face 176 is vertically disposed from and has a farther peripheral extent than the sealing surface 138. Accordingly, the curved surface 180 extends a peripheral distance P, and the curved surface 180 defines a radius of curvature R. The radius of curvature R is equal to or greater than the peripheral distance P. In the embodiment depicted, the radius of curvature R is equal to the peripheral distance P such that the curved surface 180 is an arc with a central angle θ of 90°. In various embodiments, the radius of curvature R is up to ten times the peripheral distance P such that the curved surface 180 is an arc having a central angle θ of from 8° to 90°.

Also, as with the previous embodiment, the edge face 176 and the sealing surface 138 are perpendicular in certain embodiments. However, the edge face 176 and the sealing surface 138 need not be perpendicular, and in other embodiments, the edge face 176 and the sealing surface 138 are oriented at an angle of between 60° and 120°. Further, in the embodiment depicted in FIG. 6, the peripheral edge structure 172 includes a second chamfered edge 178 that transitions from the edge face 176 back to the peripheral surface 166.

Figure 7:
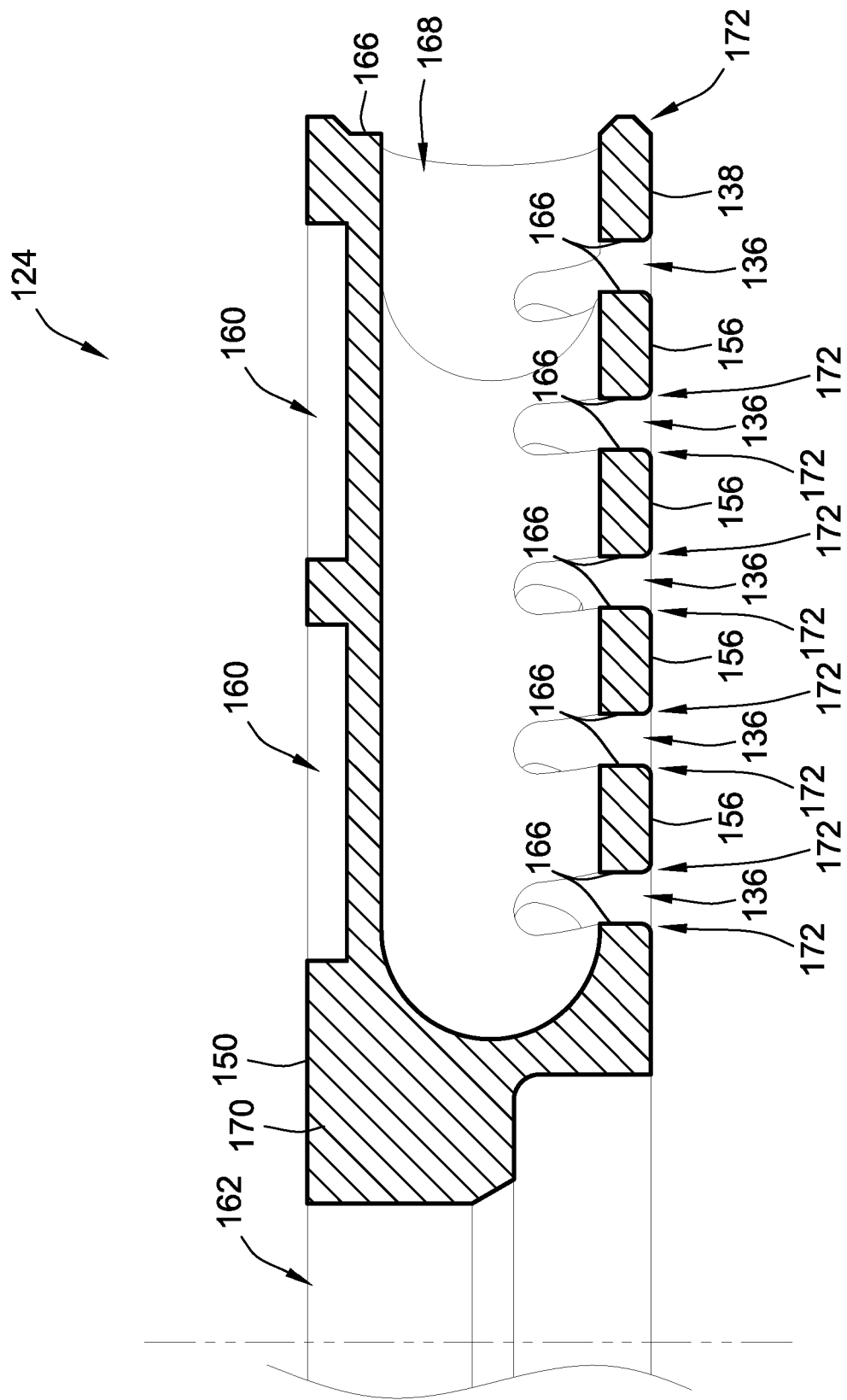
FIG. 7 depicts a metering plate in which the peripheral surfaces of the lands between the grooves include a peripheral edge structure configured to reduce discharge coefficient variation, according to an exemplary embodiment.

While FIGS. 5 and 6 considered a peripheral edge structure 172 located on the outermost peripheral surface 166 of the metering plate 124, FIG. 7 depicts peripheral edge structures 172 also located on the peripheral surfaces 166 of each of the plurality of lands 156. As discussed previously, each of the plurality of lands 156 is separated from its neighboring lands 156 by a channel 136. In this way, each land 156 has one or two peripheral surfaces 166 on which a peripheral edge structure 172 is able to be formed. As shown in the embodiment of FIG. 7, each of these peripheral surfaces 166 includes a peripheral edge structure 172; however, in other embodiments, fewer than all of the peripheral surfaces 166 have a peripheral edge structure 172. In some embodiments, the metering plate 124 includes a chamfered surface 174 (such as the chamfered surface 174 discussed above with respect to FIG. 5) as the peripheral edge structures 172 on the peripheral surfaces 166 of the lands 156. In other embodiments, the metering plate 124 includes curved surfaces 180 (such as the curved surface 180 discussed above with respect to FIG. 6) as the peripheral edge structures 172 on the peripheral surfaces 166 of the lands 156. In still other embodiments, the metering plate 124 includes both chamfered surfaces 174 and curved surfaces 180 as the peripheral edge structures 172. Further, the peripheral edge structures 172 on the peripheral surfaces 166 of the lands 156 are able to be used alone or in combination with the annular peripheral edge structure 172, such as shown in FIG. 4.

The embodiments of the peripheral edge structures 172 discussed herein are less susceptible to variation in discharge coefficient as a result of typical manufacturing tolerances. By avoiding the sharp edge between the peripheral surface 166 and the sealing surface 138 (at the outermost edge and/or at the edge of the lands), dimensional variations in the metering plate 124 produced by typical manufacturing tolerances have less of an effect on the discharge coefficient of the poppet-style valve into which the metering plate 124 is installed. In particular embodiments, the discharge coefficients of multiple poppet-style valves having a movable metering plate in accordance with the present disclosure will all be within 5% of each other across a fluid admission system. In other embodiments, the discharge coefficients will all be within 1% of each other across the fluid admission system. Further, notwithstanding the change from a sharp edge, the metering plate 124 performs as well, if not better, then an ideally sharp-edged metering plate (i.e., a sharp-edged metering plate manufactured exactly to specified dimensions). Accordingly, an engine (or other fluid admission system) equipped with poppet-style fuel injector valves having a metering plate in accordance with the present disclosure will high much tighter control over the injector flow tolerances. The tighter control allows such an engine to run more efficiently and with lower emissions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A metering plate for a poppet-style valve, the metering plate comprising:
    a fluid-directing body, the fluid-directing body defining a first surface and at least one peripheral surface substantially perpendicular to the first surface; and
    at least one peripheral edge structure located proximal to the first surface, the at least one peripheral edge structure extending between the first surface and the at least one peripheral surface;
    wherein each of the at least one peripheral edge structure includes a transition surface, the transition surface extending at least a portion of the at least one peripheral edge structure between the first surface and the at least one peripheral surface.

2. The metering plate of claim 1, wherein the at least one peripheral edge structure further comprises an edge face, the edge face defining a furthest peripheral extent of the metering plate, and wherein the transition surface extends between the first surface and the edge face.

3. The metering plate of claim 2, wherein the fluid directing body is a generally cylindrical disc such that the first surface has a first diameter, wherein the peripheral edge structure defines a second diameter at the furthest peripheral extent, and wherein the second diameter is from 0.1% to 5% larger than the first diameter.

4. The metering plate of claim 2, wherein the at least one peripheral surface spans a first vertical distance, wherein the at least one peripheral edge structure spans a second vertical distance, and wherein the second vertical distance is at least 10% of the first vertical distance.

5. The metering plate of claim 2, wherein the transition surface is a chamfer.

6. The metering plate of claim 5, wherein the chamfer extends a peripheral distance and a vertical distance between the first surface and the edge face and wherein the ratio of the peripheral distance to the vertical distance is from 1:10 to 10:1.

7. The metering plate of claim 5, wherein the edge face and the first surface are perpendicular.

8. The metering plate of claim 5, wherein the edge face and the first surface form an angle of from 60° to 120°.

9. The metering plate of claim 2, wherein the transition surface is a curved surface.

10. The metering plate of claim 9, wherein the first surface and the edge face are disposed from each other by a peripheral distance and wherein the curved surface has a radius of curvature greater than or equal to the peripheral distance.

11. The metering plate of claim 10, wherein the radius of curvature is less than ten times the peripheral distance.

12. The metering plate of claim 9, wherein the edge face and the first surface are perpendicular.

13. The metering plate of claim 9, wherein the curved surface defines an arc having a central angle of between 8° and 90°.

14. The metering plate of claim 1, wherein the first surface defines a first plurality of lands, each land of the first plurality of lands being separated from its neighboring land by a groove formed through the first surface and each land including a peripheral edge structure of the at least one peripheral edge structure between a peripheral surface of the at least one peripheral surface and the first surface.

15. The metering plate of claim 14, wherein the transition surface of each peripheral edge structure of the at least one peripheral edge structure extends an entirety of a distance between the peripheral surface of the at least one peripheral surface and the first surface.

16. The metering plate of claim 14, wherein the at least one peripheral edge structure includes a transition surface that is a chamfer.

17. The metering plate of claim 14, wherein the at least one peripheral edge structure includes a transition surface that is a curved surface.

18. A poppet-style valve, comprising:
    a movable metering plate having:
        a first plurality of lands and a first plurality of grooves formed into a first surface;
        at least one peripheral surface substantially perpendicular to the first surface; and
        at least one peripheral edge structure located proximal to the first surface, the at least one peripheral edge structure extending between the first surface and the at least one peripheral surface;
        wherein each of the at least one peripheral edge structure includes a transition surface, the transition surface extending at least a portion of the at least one peripheral edge structure between the first surface and the at least one peripheral surface;
    a fixed metering plate, having a second plurality of lands and a second plurality of grooves; and
    a solenoid configured to electromagnetically move the movable metering plate between an open position and a closed position;
    wherein, in the closed position, the first plurality of lands and the second plurality of lands are in physical contact such that the first plurality of lands blocks fluid flow through the second plurality of grooves and the second plurality of lands blocks fluid flow through the first plurality of grooves.

19. The poppet-style valve of claim 18, wherein the transition surface is a chamfer and wherein the chamfer extends a peripheral distance and a vertical distance between the first surface and the edge face and wherein the ratio of the peripheral distance to the vertical distance is from 1:10 to 10:1.

20. The poppet-style valve of claim 18, wherein the transition surface is a curved surface and wherein the curved surface defines an arc having a central angle of between 8° and 90°.

21. The poppet-style valve of claim 18, wherein the movable metering plate is a generally cylindrical disc such that the first surface has a first diameter, wherein a peripheral edge structure of the at least one peripheral edge structure defines a second diameter at a furthest peripheral extent, and wherein the second diameter is from 0.1% to 5% larger than the first diameter.

22. The poppet-style valve of claim 18, wherein a peripheral surface of the at least one peripheral surface spans a first vertical distance, wherein a peripheral edge structure of the at least one peripheral edge structure spans a second vertical distance, and wherein the second vertical distance is at least 10% of the first vertical distance.

23. The poppet-style valve of claim 18, wherein, in the open position, a gap of 1 mm or less exists between the movable metering plate and the fixed metering plate.

24. The poppet-style valve of claim 18, wherein one or more of the first plurality of lands includes a peripheral edge structure of the at least one peripheral edge structure.

25. A fluid admission system, comprising:
a gaseous intake manifold;
a fluid supply manifold; and
at least two poppet-style valves, each poppet-style valve configured to allow fluid flow from the fluid supply manifold into the gaseous intake manifold in an open configuration and to prevent fluid flow from the fluid supply manifold into the gaseous intake manifold in a closed configuration;
wherein each poppet-style valve includes:
a fixed metering plate;
a movable metering plate; and
a solenoid configured to electromagnetically actuate the poppet-style valve between the open configuration in which the fixed metering plate and the movable metering plate are separated by a gap and the closed configuration in which the fixed metering plate and the movable metering plate are in direct, physical contact;
wherein the movable metering plate is defined by:
a first surface,
at least one peripheral surface substantially perpendicular to the first surface; and
at least one peripheral edge structure located proximal to the first surface, the at least one peripheral edge structure extending between the first surface and the at least one peripheral surface;
wherein each of the at least one peripheral edge structure includes a transition surface, the transition surface extending at least a portion of the at least one peripheral edge structure between the first surface and the at least one peripheral surface.

26. The fluid admission system of claim 25, wherein each poppet-style valve has a discharge coefficient and wherein all of the discharge coefficients of each poppet-style valve are within 5% of each other.

* * * * *